United States Patent
Komatsu

(10) Patent No.: US 11,760,185 B2
(45) Date of Patent: Sep. 19, 2023

(54) ELECTRIC VEHICLE

(71) Applicant: HONDA MOTOR CO., LTD., Tokyo (JP)

(72) Inventor: Daigo Komatsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 17/511,785

(22) Filed: Oct. 27, 2021

(65) Prior Publication Data

US 2022/0126668 A1 Apr. 28, 2022

(30) Foreign Application Priority Data

Oct. 28, 2020 (JP) ................. 2020-180760

(51) Int. Cl.
| | | |
|---|---|---|
| *B60H 1/24* | (2006.01) | |
| *B60K 1/04* | (2019.01) | |
| *B60L 58/26* | (2019.01) | |
| *B60K 1/00* | (2006.01) | |

(52) U.S. Cl.
CPC ............... *B60K 1/04* (2013.01); *B60L 58/26* (2019.02); *B60K 2001/005* (2013.01); *B60K 2001/0416* (2013.01); *B60K 2001/0422* (2013.01)

(58) Field of Classification Search
CPC ........ B60K 2001/003; B60K 2001/005; B60K 2001/0416; B60K 11/06; B60H 1/00278
USPC ......................................................... 454/144
See application file for complete search history.

(56) References Cited

U.S. PATENT DOCUMENTS

| | | | | |
|---|---|---|---|---|
| 7,419,209 | B1* | 9/2008 | Mangiapane | H01M 50/244 296/63 |
| 8,272,685 | B2* | 9/2012 | Lucas | B60N 2/5635 297/180.12 |
| 2007/0040418 | A1* | 2/2007 | Ohkuma | B60K 1/04 297/15 |
| 2008/0062622 | A1* | 3/2008 | Fukazu | H01M 50/249 361/678 |
| 2009/0088062 | A1* | 4/2009 | Major | H01M 10/625 454/70 |
| 2010/0071980 | A1 | 3/2010 | Kokaji et al. | |
| 2010/0089675 | A1 | 4/2010 | Nagata et al. | |

(Continued)

FOREIGN PATENT DOCUMENTS

| | | |
|---|---|---|
| JP | 2010-285070 A | 12/2010 |
| JP | 2014-058249 A | 4/2014 |

(Continued)

OTHER PUBLICATIONS

Jul. 12, 2022, Japanese Office Action issued for related JP Application No. 2020-180760.

(Continued)

*Primary Examiner* — Ko-Wei Lin
(74) *Attorney, Agent, or Firm* — Paratus Law Group, PLLC

(57) ABSTRACT

An electric vehicle includes a seat which is supported on a floor panel via a support member, a battery pack which is disposed behind the seat, and an air intake duct which has an air inlet and through which air taken in from the air inlet is supplied to the battery pack. The air inlet is disposed at a position overlapping the support member as viewed from above, and is located between the floor panel and the support member in an up-down direction.

6 Claims, 5 Drawing Sheets

(56) References Cited

U.S. PATENT DOCUMENTS

| | | | | |
|---|---|---|---|---|
| 2011/0278874 A1* | 11/2011 | Lucas | ................... | F16L 11/12 |
| | | | | 138/119 |
| 2014/0196866 A1* | 7/2014 | Bezzina | ............ | B60H 1/00278 |
| | | | | 165/42 |
| 2016/0250915 A1* | 9/2016 | Kobukata | .............. | B62D 43/10 |
| | | | | 180/68.5 |
| 2017/0106910 A1* | 4/2017 | Mitani | ................... | B60K 1/04 |
| 2017/0334309 A1* | 11/2017 | Kouno | ................... | B60K 1/00 |
| 2018/0050606 A1 | 2/2018 | Sugitate et al. | | |
| 2018/0056894 A1 | 3/2018 | Tsumura et al. | | |
| 2018/0065458 A1 | 3/2018 | Ogawa et al. | | |
| 2018/0345759 A1* | 12/2018 | Okumura | ............... | B62D 25/20 |
| 2020/0148027 A1* | 5/2020 | Aoki | ....................... | B60K 1/04 |
| 2020/0406734 A1* | 12/2020 | Choi | ....................... | B60K 1/04 |
| 2021/0039716 A1* | 2/2021 | Sasaoka | .............. | B62D 21/157 |

FOREIGN PATENT DOCUMENTS

| | | | |
|---|---|---|---|
| JP | 2018-030447 A | 3/2018 | |
| JP | 2018-034751 A | 3/2018 | |
| JP | 2020-172224 A | 10/2020 | |

OTHER PUBLICATIONS

Nov. 8, 2022, Japanese Decision to Grant a Patent issued for related JP Application No. 2020-180760.
Feb. 25, 2023, Translation of Chinese Office Action issued for related CN Application No. 202111218307.5.

\* cited by examiner

FIG. 5
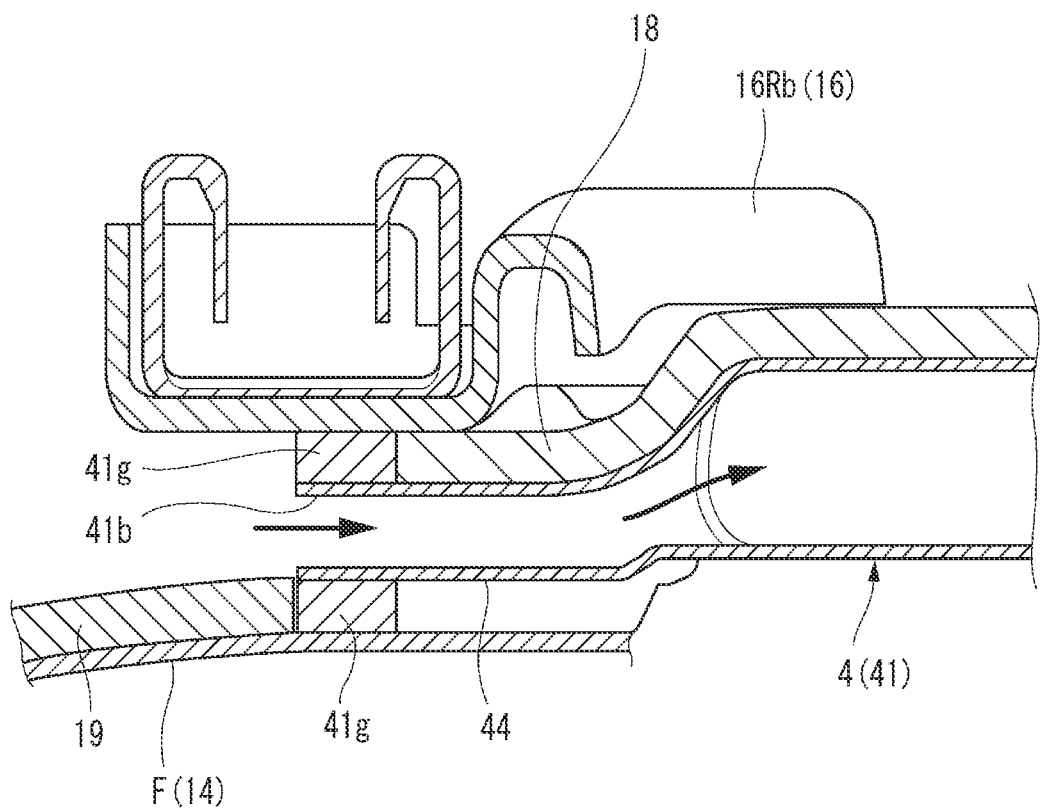
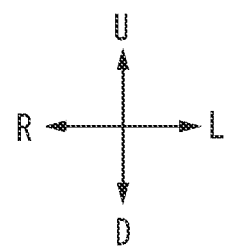

ELECTRIC VEHICLE

CROSS-REFERENCE TO RELATED APPLICATIONS

This application is based on and claims priority under 35 USC 119 from Japanese Patent Application No. 2020-180760 filed on Oct. 28, 2020.

TECHNICAL FIELD

The present disclosure relates to an electric vehicle.

BACKGROUND ART

JP-A-2018-30447 discloses that an air inlet and a drainage outlet are provided in a cover member which covers a power device unit serving as a battery pack, and when the air inlet is blocked, the drainage outlet can be used as an emergency air inlet.

However, when the air inlet and the drainage outlet are provided in the cover member, the air inlet and the drainage outlet may be blocked by a carpet or the like. On the other hand, it is also considered to cool the battery pack via an air intake duct disposed below a seat, but it is necessary to make improvement so that an air inlet of the air intake duct is not blocked.

The present disclosure provides an electric vehicle capable of preventing an air inlet of an air intake duct from being blocked.

SUMMARY OF INVENTION

According to an aspect of the present disclosure, there is provided an electric vehicle including a seat that is supported on a floor panel via a support member, a battery pack that is disposed behind the seat, and an air intake duct that has an air inlet and through which air taken in from the air inlet is supplied to the battery pack, in which the air inlet is disposed at a position overlapping the support member as viewed from above, and is located between the floor panel and the support member in an up-down direction.

According to the present disclosure, it is possible to prevent an air inlet of an air intake duct from being blocked.

BRIEF DESCRIPTION OF DRAWINGS

FIG. 5 is a cross-sectional view taken along a line B-B of FIG. 4.

DESCRIPTION OF EMBODIMENTS

Figure 1:
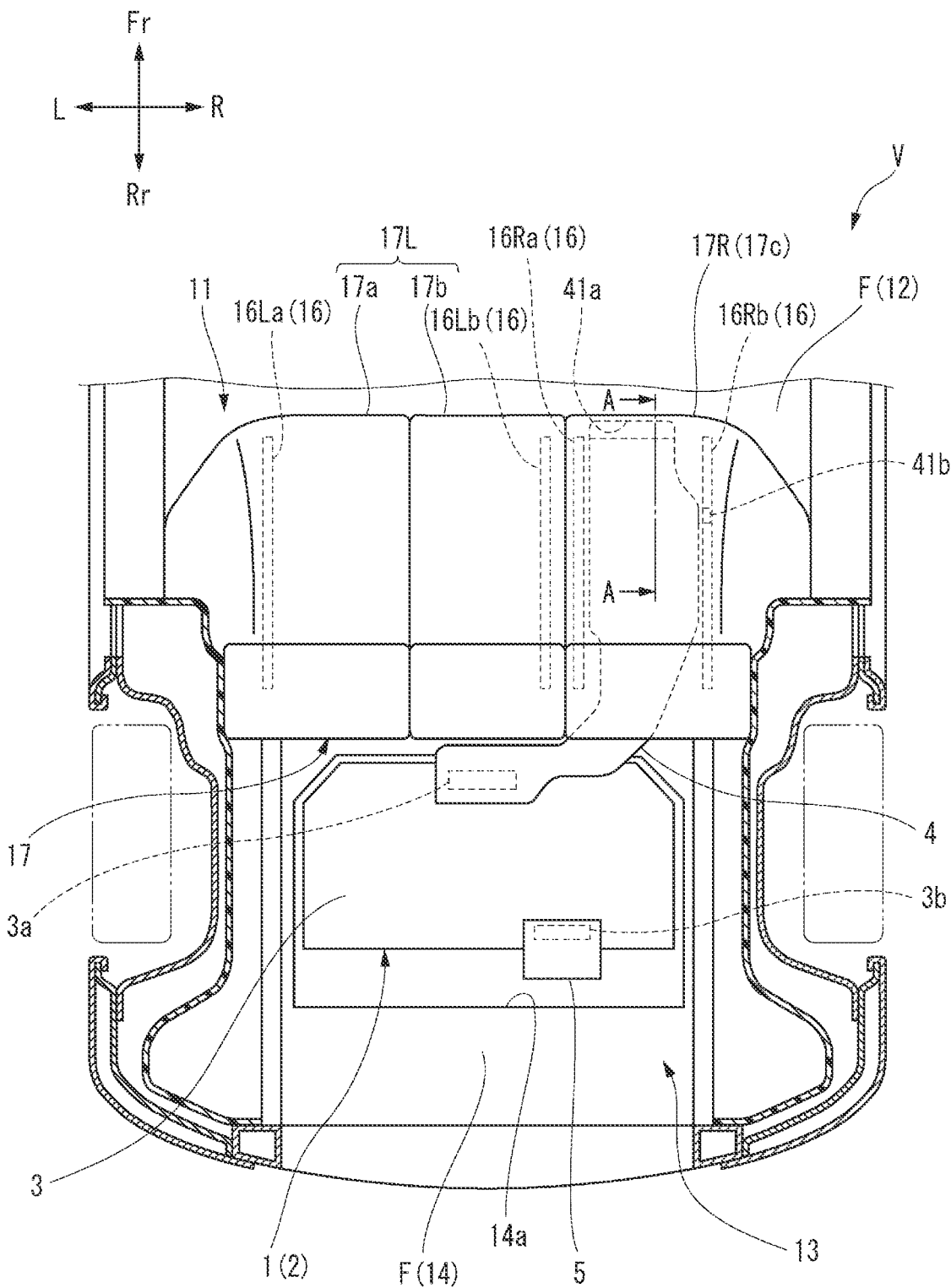
FIG. 1 is a plan view illustrating a rear portion of a vehicle interior and a luggage compartment of a vehicle according to an embodiment of the present disclosure.

Hereinafter, an embodiment of the present disclosure will be described with reference to FIGS. 1 to 5. The drawings are to be viewed from a direction of reference signs, and in the following descriptions, front, rear, left, right, up and down are based on directions viewed from a driver. A front side of a vehicle in the drawings is denoted by Fr, a rear side thereof is denoted by Rr, a left side thereof is denoted by L, a right side thereof is denoted by R, an upper side thereof is denoted by U. and a lower side thereof is denoted by D.

[Vehicle]

Figure 2:
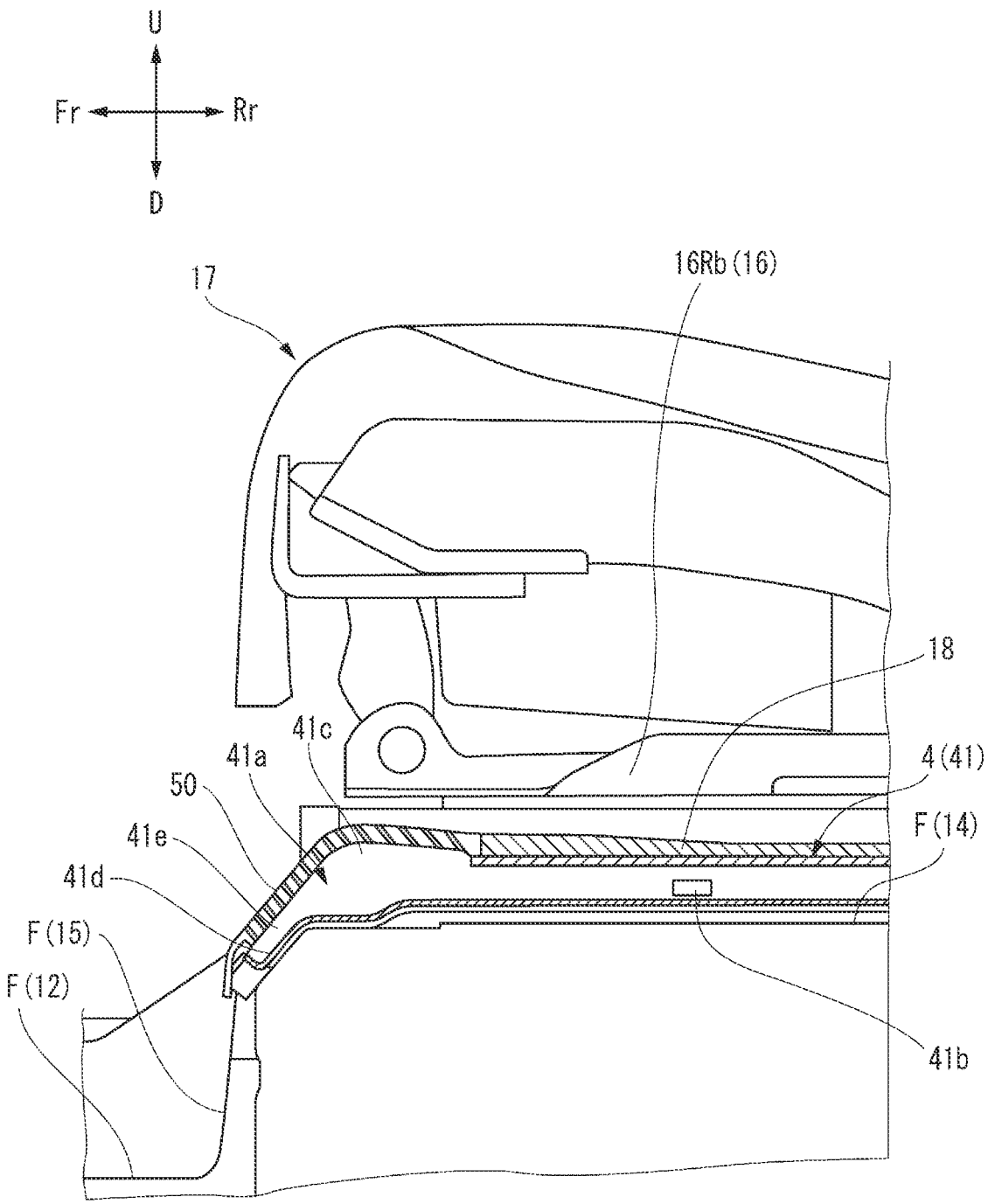
FIG. 2 is a cross-sectional view taken along a line A-A of FIG. 1.

As illustrated in FIGS. 1 and 2, an electric vehicle V (hereinafter, referred to as a vehicle V) of the present embodiment is, for example, a hybrid vehicle, and a battery pack 1 which accommodates a battery (not illustrated) is mounted.

A floor panel F of the vehicle V includes a front floor panel portion 12 which constitutes a floor portion of a vehicle interior 11, a rear floor panel portion 14 which constitutes a floor portion below a rear seat 17 and a floor portion of a luggage compartment 13, and a kick-up portion 15 which connects the front floor panel portion 12 and the rear floor panel portion 14 to form a step shape.

A center tunnel (not illustrated) is formed along a front-rear direction at a center portion of the front floor panel portion 12 in a vehicle width direction. The center tunnel is bent such that the front floor panel portion 12 protrudes toward the upper side, and a trapezoidal tunnel space is formed below the center tunnel. An exhaust pipe (not illustrated) or the like which discharges exhaust gas from an internal combustion engine to the rear side of the vehicle V is disposed in the tunnel space.

An accommodating recess 14a accommodating the battery pack 1 is recessed in the rear floor panel portion 14 below the luggage compartment 13, and the battery pack 1 is disposed in the accommodating recess 14a.

The rear seat 17 is supported on a front upper portion of the rear floor panel portion 14 via a plurality of seat rails 16 extending along the front-rear direction. The rear seat 17 includes a left rear seat unit 17L (hereinafter, may be simply referred to as a rear seat 17) which integrally constitutes a left rear seat 17a and a central rear seat 17b, and a right rear seat unit 17R (hereinafter, may be simply referred to as a rear seat 17) which constitutes a right rear seat 17c.

The seat rails 16 include a pair of left seat rails 16La and 16Lb (hereinafter, may be simply referred to as seat rails 16) which guides the left rear seat unit 17L in the front-rear direction, and a pair of right seat rails 16Ra and 16Rb (hereinafter, may be simply referred to as seat rails 16) which guides the right rear seat unit 17R in the front-rear direction. Each of the seat rails 16 is attached to an upper surface portion of the rear floor panel portion 14 at predetermined intervals.

[Battery Pack]

As illustrated in FIG. 1, the battery pack 1 includes a battery case 2 and a battery cover 3 which covers an opening of the battery case 2. Inside the battery pack 1, the battery, a control device (not illustrated) such as a battery ECU, and a cooling component such as a cooling fan are accommodated.

The battery cover 3 includes an introduction port 3a through which cooling air is introduced from the vehicle interior 11 via an air intake duct 4, and a discharge port 3b through which the cooling air is discharged to the luggage compartment 13 via an exhaust duct 5 after being used in cooling the battery. Hereinafter, the air intake duct 4, which is a main part of the present disclosure, and an arrangement configuration thereof will be described with reference to FIGS. 1 to 5.

[Air Intake Duct]

Figure 3:
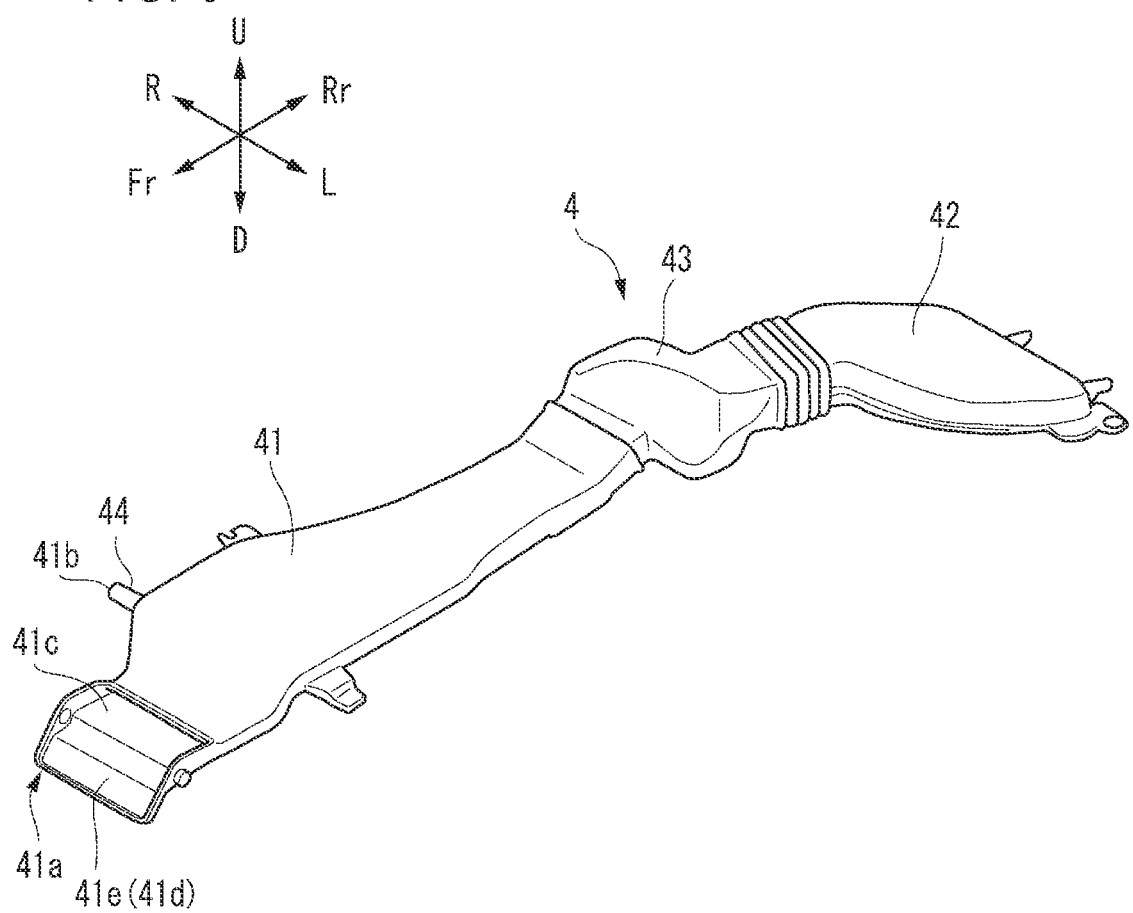
FIG. 3 is a perspective view of an air intake duct.

As illustrated in FIG. 3, the air intake duct 4 includes a duct main body 41 which has a first air inlet 41a (main air inlet), a battery connecting portion 42 which is connected to the introduction port 3a of the battery pack 1, a connecting portion 43 which connects the duct main body 41 and the battery connecting portion 42, and a branch portion 44 which branches from the duct main body 41 and extends in the vehicle width direction. The air intake duct 4 is disposed along an upper surface of the rear floor panel portion 14. The upper side of the air intake duct 4 is covered by a carpet 18 laid on the upper surface of the rear floor panel portion 14.

Figure 4:
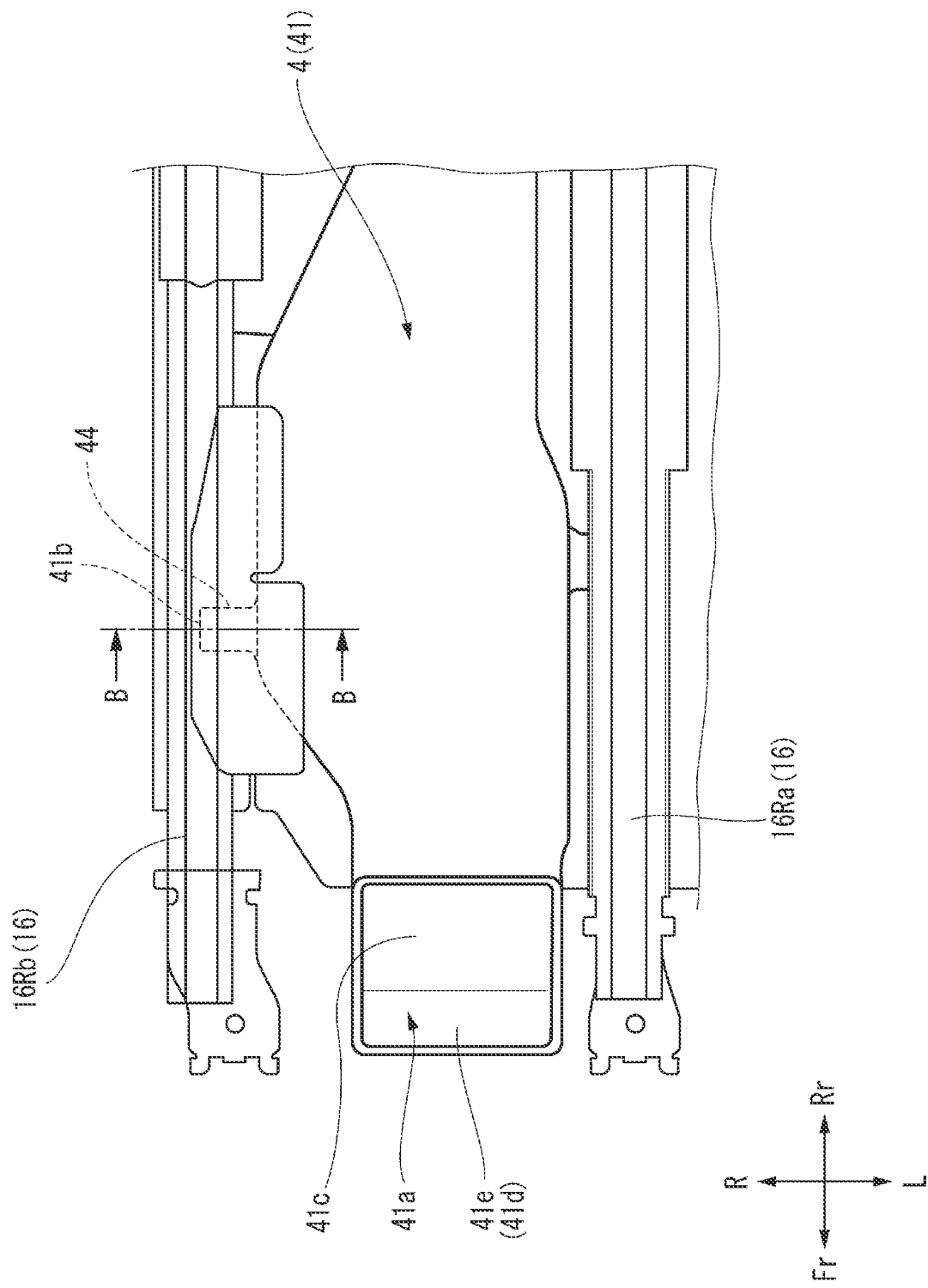
FIG. 4 is a plan view of a main part illustrating arrangement of the air intake duct.

As illustrated in FIGS. 1 and 4, at least the duct main body 41 of the air intake duct 4 is disposed between the pair of seat rails 16Ra and 16Rb in a space below the rear seat 17. In this way, a space between the pair of seat rails 16Ra and 16Rb can be effectively used for disposing the duct main body 41.

As illustrated in FIGS. 2 to 4, the first air inlet 41a is provided at a front end portion of the duct main body 41. The first air inlet 41a includes an upper opening portion 41c which faces the upper side in an up-down direction, and a front opening portion 41e which is provided in an inclined surface 41d, which is inclined obliquely downward from the upper opening portion 41c toward the front side. A front end portion of the front opening portion 41e is located at the same position as a front end portion of the rear seat 17 or on a rear side of the front end portion of the rear seat 17. In FIG. 2, a reference sign 50 denotes an air intake grill which covers the front opening portion 41e and the upper opening portion 41c. According to such a configuration, water or foreign matters can be prevented from entering the first air inlet 41a, and since opening area of the first air inlet 41a can be increased, it is possible to reduce the occurrence of pressure loss, noise, and the like which accompany air intake.

As illustrated in FIGS. 3 to 5, the air intake duct 4 includes the branch portion 44 which extends from the duct main body 41 in the vehicle width direction (rightward in the present embodiment), and a second air inlet 41b (emergency air inlet) is provided at a tip end portion of the branch portion 44. The second air inlet 41b is disposed at a position overlapping the seat rail 16 as viewed from above, and is located between the rear floor panel portion 14 and the seat rail 16 in the up-down direction. According to such a configuration, even when the first air inlet 41a of the duct main body 41, which is a main air inlet, is blocked, the second air inlet 41b can function as an emergency air inlet since the seat rail 16 can prevent the second air inlet 41b from being blocked. In addition, since the second air inlet 41b is disposed below the seat rail 16 extending in the front-rear direction, there is an advantage that a position of the second air inlet 41b in the front-rear direction can be appropriately selected and a degree of freedom in design is high.

As illustrated in FIG. 1, the second air inlet 41b is disposed below the seat rail 16Rb located on an outermost side in the vehicle width direction. Compared with a center portion in the vehicle width direction below the rear seat 17, which is relatively closed and has little air circulation, a portion below the seat rail 16Rb located on the outermost side in the vehicle width direction is easier for a low-temperature circulating air current of an air conditioner to reach, and is easier for air of the vehicle interior 11, whose temperature is controlled, to be taken in from the second air inlet 41b. In addition, since a heat source such as an exhaust pipe is often disposed at a center of the vehicle, air having a low temperature can be taken in by disposing the second air inlet 41b below the seat rail 16 located on the outermost side in the vehicle width direction. The duct main body 41 may be disposed between the pair of seat rails 16La and 16Lb, and the second air inlet 41b may be disposed below the seat rail 16La. The present disclosure is not limited thereto, and the second air inlet 41b may be disposed below the seat rail 16Lb or the seat rail 16Ra.

As illustrated in FIG. 5, a protrusion 41g which restricts the carpet 18 from blocking the second air inlet 41b is provided integrally or separately with the branch portion 44 around the second air inlet 41b. Specifically, the protrusion 41g engages with an end portion of the carpet 18 in the vehicle width direction, and prevents the carpet 18 from being displaced in the vehicle width direction and blocking the second air inlet 41b. In the present embodiment, the protrusion 41g is a foamed joint sealant (EPT-sealer) provided around the branch portion 44, and restricts movement of the carpet 18 covering the air intake duct 4. Accordingly, it is possible to prevent the carpet 18 from blocking the second air inlet 41b while preventing the duct main body 41 from being exposed from the carpet 18. By aligning the protrusion 41g and a carpet 18, which covers the rear floor panel portion 14 below the rear seat 17, to the same height in the up-down direction, the protrusion 41g also prevents the carpet 18 from blocking the second air inlet 41b.

The above-described embodiment may be appropriately modified, improved, or the like. For example, the seat is not limited to a rear seat, and may be a front seat. In addition, the support member which supports the seat is not limited to a seat rail, and may be a member which fixedly supports the seat.

Further, the number of second air inlets 41b is not limited to one, and a plurality of second air inlets 41b may be used, and the second air inlet 41b may be used as a main air inlet. When the second air inlet 41b is used as the main air inlet, the first air inlet 41a is not necessarily required.

In the present specification, at least the following matters are described. Although corresponding components or the like in the above-described embodiment are shown in parentheses, the present invention is not limited thereto.

(1) An electric vehicle (electric vehicle V), including:
a seat (rear seat 17) which is supported on a floor panel (rear floor panel portion 14) via a support member (seat rail 16);
a battery pack (battery pack 1) which is disposed behind the seat; and
an air intake duct (air intake duct 4) which has an air inlet (second air inlet 41b) and through which air taken in from the air inlet is supplied to the battery pack, in which
the air inlet is disposed at a position overlapping the support member as viewed from above, and is located between the floor panel and the support member in an up-down direction.

According to (1), since the air inlet of the air intake duct is disposed at the position overlapping the support member as viewed from above, it is possible to prevent the air inlet from being blocked.

(2) The electric vehicle according to (1), in which:
the air intake duct includes
a duct main body (duct main body 41) which extends in a front-rear direction below the seat, and
a branch portion (branch portion 44) which extends in a vehicle width direction from the duct main body:
the duct main body is provided with a first air inlet (first air inlet 41a); and
the branch portion is provided with a second air inlet (second air inlet 41b) which is the air inlet.

According to (2), even when the first air inlet of the duct main body, which is a main air inlet, is blocked, the second air inlet disposed below the support member functions as an emergency air inlet.

(3) The electric vehicle according to (2), in which:
a carpet (carpet 18) is provided on an upper portion of the duct main body; and
a protrusion (protrusion 41g) which restricts the carpet from blocking the second air inlet is provided integrally or separately with the branch portion around the second air inlet.

According to (3), the protrusion provided around the second air inlet can prevent the carpet from blocking the second air inlet and the carpet can prevent the air intake duct from being exposed.

(4) The electric vehicle according to (2) or (3), in which:
the first air inlet includes
an upper opening portion (upper opening portion 41c) which faces an upper side in the up-down direction, and
a front opening portion (front opening portion 41e) which is provided in an inclined surface (inclined surface 41d), which is inclined obliquely downward from the upper opening portion toward a front side; and
a front end portion of the front opening portion is disposed at a same position as a front end portion of the seat, or on a rear side of the front end portion of the seat.

According to (4), since the front end portion of the front opening portion is disposed at the same position as the front end portion of the seat or on the rear side of the front end portion of the seat, even when an occupant spills water or drops a foreign matter, water and the foreign matter can be prevented from entering the first air inlet. Further, since the first air inlet includes the upper opening portion and the front opening portion, even when the front opening portion is blocked by luggage or the like, air can be taken in from the upper opening portion.

(5) The electric vehicle according to any one of (1) to (4), in which
the support member is one of a pair of seat rails (seat rail 16) which guides the seat in the front-rear direction.

According to (5), since the air inlet is disposed below one of the seat rails extending in the front-rear direction, a position in the front-rear direction can be appropriately selected, and a degree of freedom in design is high.

(6) The electric vehicle according to (5), in which
the one of the pair of seat rails is a seat rail located on an outermost side in the vehicle width direction.

According to (6), compared with a center portion in the vehicle width direction below the seat, which is relatively closed and has little air circulation, a portion below the seat rail located on the outermost side in the vehicle width direction is easier for a low-temperature circulating air current of an air conditioner to reach. A heat source such as an exhaust pipe is often disposed at a center of the vehicle. Therefore, by disposing the air inlet below the seat rail located on the outermost side in the vehicle width direction, air having a low temperature can be taken in.

(7) The electric vehicle according to (5) or (6), in which
the air intake duct is disposed between the pair of seat rails.

According to (7), a space between the pair of seat rails can be effectively used.

What is claimed is:

1. An electric vehicle comprising:
a seat which is supported on a floor panel via a support member;
a battery pack which is disposed behind the seat; and
an air intake duct which has an air inlet and through which air taken in from the air inlet is supplied to the battery pack, wherein
the air intake duct includes
a duct main body which extends in a front-rear direction below the seat, and
a branch portion which extends in a vehicle width direction from the duct main body;
the duct main body is provided with a first air inlet;
the branch portion is provided with the air inlet; and
the air inlet is disposed at a position overlapping the support member as viewed from above, and is located between the floor panel and the support member in an up-down direction.

2. The electric vehicle according to claim 1, wherein:
a carpet is provided on an upper portion of the duct main body; and
a protrusion which restricts the carpet from blocking the air inlet is provided integrally or separately with the branch portion around the air inlet.

3. The electric vehicle according to claim 1, wherein:
the first air inlet includes
an upper opening portion which faces an upper side in the up-down direction, and
a front opening portion which is provided in an inclined surface, which is inclined obliquely downward from the upper opening portion toward a front side; and
a front end portion of the front opening portion is disposed at a same position in the front-rear direction as a front end portion of the seat, or on a rear side of the front end portion of the seat.

4. The electric vehicle according to claim 1, wherein
the support member is one of a pair of seat rails which guides the seat in the front-rear direction.

5. The electric vehicle according to claim 4, wherein
the one of the pair of seat rails is a seat rail located on an outermost side in the vehicle width direction.

6. The electric vehicle according to claim 4, wherein
the air intake duct is disposed between the pair of seat rails.

* * * * *